Figure 1:
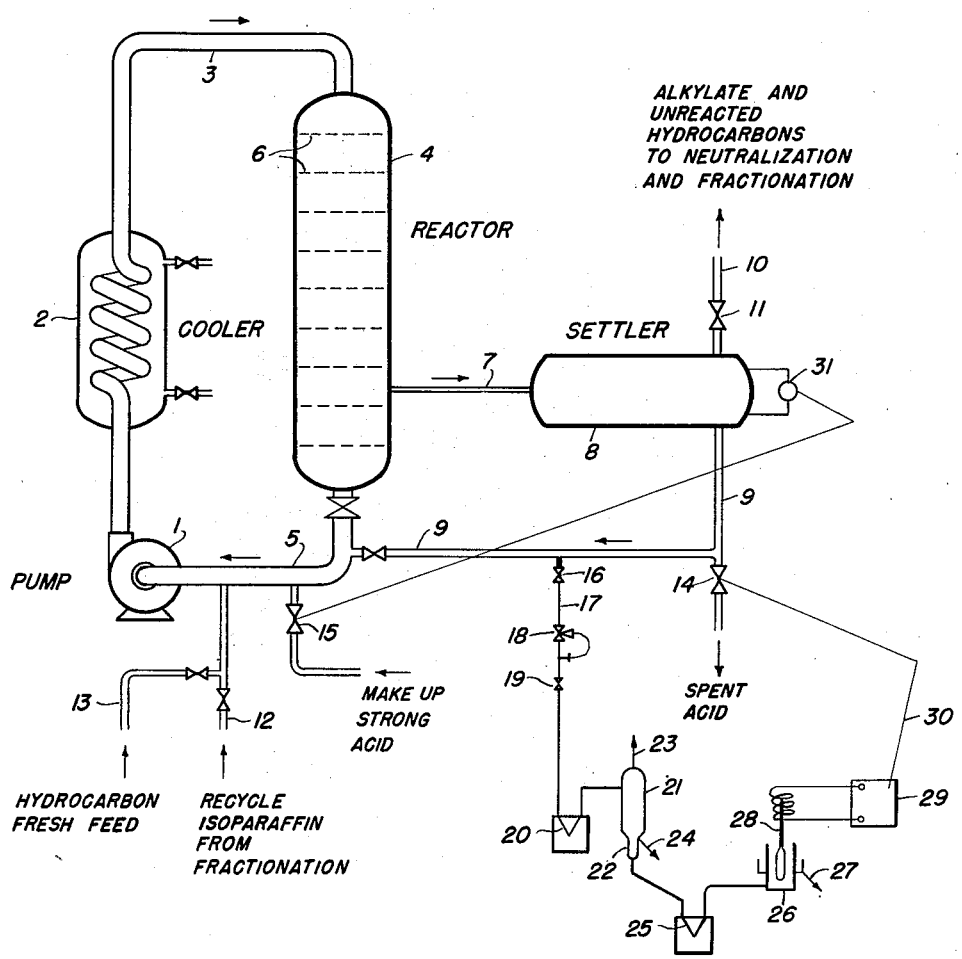

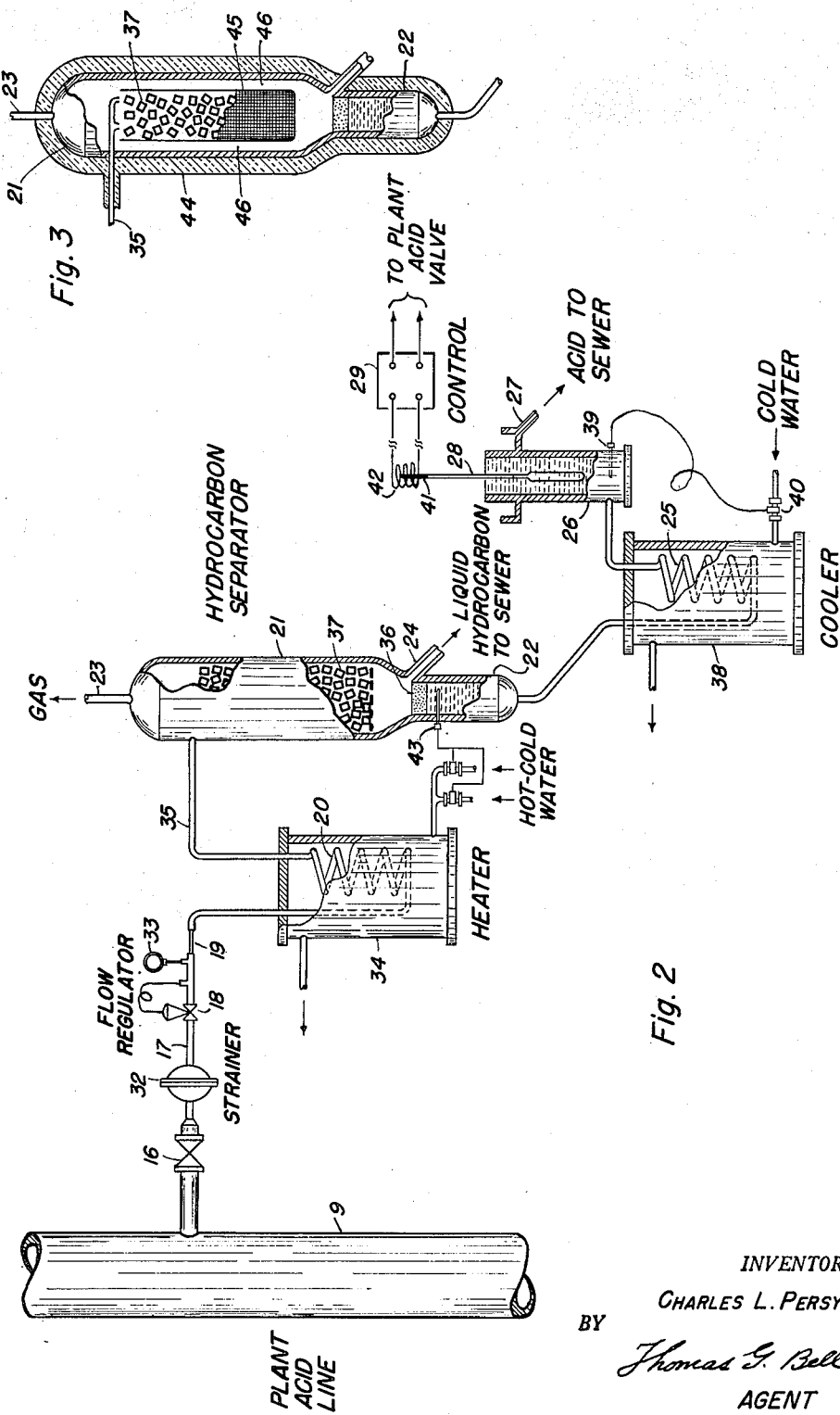

Patented Apr. 8, 1952

2,592,063

UNITED STATES PATENT OFFICE 2,592,063

ACID ANALYZER AND CONTROLLER

Charles L. Persyn, Jr., Associated, Calif., assignor to Tide Water Associated Oil Company, San Francisco, Calif., a corporation of Delaware Application December 15, 1949, Serial No. 133,184

8 Claims. (Cl. 23—253)

This invention relates to the determination of the strength of sulfuric acid employed in hydrocarbon alkylation processes and in similar processes wherein sulfuric acid is contacted with normally gaseous hydrocarbons. The invention also relates to the automatic control of fresh acid supplied to such processes in accordance with the strength of the partially used acid circulated therein or in accordance with the strength of spent acid withdrawn therefrom.

In the alkylation of isoparaffinic or aromatic hydrocarbons with low molecular weight olefins, such as butylene, using sulfuric acid as catalyst it is common practice to thoroughly contact the hydrocarbons to be reacted with strong sulfuric acid at relatively low temperatures (in the neighborhood of 40° F.) and under sufficient pressure to maintain the hydrocarbons in the liquid phase. As alkylation proceeds the reaction mixture is withdrawn to a settler wherein the alkylate, and unreacted hydrocarbons, separate from the acid and are removed for fractionation and/or further processing. The settled acid is returned to the process together with fresh hydrocarbon feed. Due to side-reactions, the strength of the recycled acid gradually drops and must be replaced, at least in part, by fresh acid to maintain the acid in the reaction mixture at the desired strength for optimum results. Accordingly, in the operation of such processes, it is highly desirable to make frequent checks on the strength of acid in the system.

Such checks of the acid strength are customarily made by withdrawing a sample of acid being returned from the settler and, after permitting dissolved hydrocarbons to evaporate, determining the gravity of the acid with a hydrometer. Determinations of acid strength made in this manner are troublesome, inaccurate, and time consuming. In the first place, upon withdrawal of a sample, normally gaseous hydrocarbons dissolved in the acid suddenly volatilize and form with the acid a stiff foam which normally requires an hour or more to "break." Secondly, normally liquid hydrocarbons emulsified with the acid separate therefrom rather irregularly and cause erratic gravity determinations.

The present invention provides a means for continuously withdrawing a sample stream of the acid and removing therefrom dissolved volatile hydrocarbons and emulsified hydrocarbons, thereby providing a continuous stream of clear acid on which gravity determinations may be readily made. In a specific embodiment of the invention a hydrometer may be continually floated in the stream of clear acid and spot readings may be made of the gravity at any time or the control element of a recording hydrometer may be immersed in the stream and its gravity may thereby be continuously recorded. In a more specific form of the invention, by suitable instrumentation, the gravity of the clear acid may be made to control the admission of fresh acid to, and/or the withdrawal of used acid from, the alkylation system.

The invention may more readily be understood by reference to the drawing whereof Figure 1 is an illustrative flow diagram of a typical isobutane-sulfuric acid alkylation process to which is attached apparatus embodying the invention. Figure 2 is an illustration, on more enlarged scale, of apparatus suitable for processing the sample stream in accordance with the invention. Figure 3 is a view, partly in section, of a preferred form of one of the elements illustrated in Figure 2. It is to be understood that the specific form of alkylation process depicted in Figure 1, though conventionally used in many installations, is for the purpose of illustration and the invention broadly may be used in combination with other forms of apparatus and other processing steps. Likewise, the invention is not necessarily limited to the specific form of apparatus illustrated in Figure 2.

Referring to Figure 1, there is illustrated diagrammatically the flow of materials between the reactor, circulating pump, cooler, and settler in a common type of sulfuric acid alkylation process. In operation, a large stream of hydrocarbons (e. g. isobutane) undergoing alkylation and strong sulfuric acid catalyst (e. g. 86%–92% $H_2SO_4$) are continuously circulated by pump 1, through cooler 2, line 3, reactor 4, and back to pump 1 through line 5. Commonly, a volume ratio of acid to hydrocarbons of 1:1 is used, though other ratios are usable. Thorough mixing of the hydrocarbons with the acid is maintained by the mixing action of pump 1 and also by baffles 6 located in reactor 4. A side-stream of the mixture is continuously withdrawn from a convenient point of the system, as through line 7, to settler 8 wherein the acid is permitted to settle from the alkylated and non-reacted hydrocarbons. The settled acid is returned to the system through line 9 and the hydrocarbons are withdrawn through line 10 for neutralization and fractionation into alkylate product, recycle isoparaffin, and any other hydrocarbons. Suitable back-pressure is maintained on the system by valve 11 to insure the hydrocarbons being in the liquid phase. The recycle isoparaffin from the fractionation is returned to the system at a convenient point, such as near the intake of pump 1 as illustrated by line 12. Make-up isobutane and olefin feed are introduced through line 13. In usual petroleum refining practice such fresh feed contains, in addition to isoparaffins and olefins, a substantial quantity of inert normal paraffins such as normal butane.

Due primarily to side-reactions, the strength of the acid circulated in a system such as described above gradually decreases until a point is reached where the strength is uneconomically low for the production of good quality alkylate. If not corrected, the acid strength may become so low that various undesirable side-reactions occur. In order to maintain the acid-strength at the economic optimum, spent acid is withdrawn from time to time through valve 14 and strong make-up acid introduced through valve 15. In order to determine the amount of spent acid to be withdrawn and/or the amount of strong acid to be added to the system, it is desirable to determine, at least occasionally, the strength of the acid in the system. For this purpose there is provided in line 9 a sample valve 16 from which a sample of the acid may be withdrawn and tested for strength, a specific gravity determination of the acid being sufficient for practical purposes providing the sample is properly freed of dissolved hydrocarbons.

As stated previously, much difficulty is expected in withdrawing a sample of the acid from the system and preparing the same for a satisfactory gravity (or other) determination. Due to the pressure and temperature prevailing in the system, the acid in line 9 contains substantial quantities of dissolved $C_4$ hydrocarbons and, also, heavier hydrocarbons. Upon release of the pressure, the sample withdrawn through line 9 immediately becomes a stiff foam which can be handled only with difficulty and which must be permitted to stand for an hour or more to "break" and permit the volatile and non-volatile hydrocarbons to separate sufficiently for a gravity determination of any practical significance. This long time-interval between the withdrawal of a sample of the acid and the determination of its strength, with subsequent calculation of the amounts of spent acid to be withdrawn and strong acid to be added to the system, results in erratic control of the acid strength in the system with probable waste of acid from over correction and/or non-optimimum operation of the process from undercorrection. The procedure also requires a considerable amount of time of a skilled operator.

The present invention provides a means whereby a clear sample of the acid may be continuously withdrawn from the system in suitable condition for immediate gravity determination. If desired, a continuous reading of the gravity may be made or automatically recorded. By the use of proper instrumentation in combination with the invention, continuous and automatic control of the withdrawal of spent acid from the alkylation system and supply of strong acid thereto may be effected.

To this end, and in accordance with the invention, there is attached to sample valve 16 a sample line 17 provided with a flow-controller permitting a small sample stream of approximately a gallon or two per hour to be continuously withdrawn from line 9. The flow controller may be of any desired form but may advantageously be (as indicated in Figure 1) a simple pressure reducing valve 18 followed by a restriction 19. From the flow-controller the sample stream is passed through a heating coil 20 and, thence, to a small flash chamber 21 and trap 22. In chamber 21 normally gaseous hydrocarbons flash off from the heated acid and leave through vent 23, after which the acid runs down into trap 22 where normally liquid hydrocarbons separate and are skimmed off through line 24. From trap 22 the clear acid flows by gravity through cooling coil 25 and thence to hydrometer jar 26, whence it overflows and leaves through line 27. Within jar 26 is floated hydrometer 28 which indicates the gravity of the acid flowing through jar 26. By noting the reading of hydrometer 28 from time to time the operator may be readily advised of the strength of the acid in the alkylation system and may make any desired correction thereto by adding strong acid and withdrawing used acid. By means of a suitable recording instrument (indicated in Figure 1 by controller 29) cooperating with hydrometer 28 (or with a separate gravity-sensitive element responsive to the gravity of the acid in jar 26) the gravity of the acid may be continuously and automatically recorded. Instrument 29 may advantageously be an automatic controller type whereby spent acid valve 14 may be automatically governed by the gravity of the acid stream in jar 26 as is indicated by control line 30. To control the admission of strong acid to compensate for the spent acid withdrawn under the control of instrument 29, settler 8 may be provided with level-controller 31 operating valve 15 as indicated in accordance with the acid-hydrocarbon interface level in settler 8.

As an alternative, if desired, controller 29 may be designed to operate valve 15 instead of valve 14, thus controlling the admission of strong acid to the alkylation system in accordance with the gravity of the sample acid stream. When this alternative is used, level control 31 may advantageously be made to operate spent acid valve 14.

No claim is made in the present invention to any particular type of gravity-controller 29 or liquid-level controller 31. Several types of each are well known in the trade and their adaptation to the purposes of the invention are well within the skill of an instrument engineer.

When such automatic controls are used, the strong make-up acid supplied through valve 15 may be either fresh acid or, when two or more alkylation units are operated in series, it may be used acid from a previous unit in the series, fresh acid being supplied to the first unit of the series.

Figure 2 illustrates in more detail apparatus suitable for practicing the invention. Parts similar to parts in Figure 1 bear the same respective reference numerals. In operation, a sample stream of acid is drawn from plant acid line 9, through sample valve 16 and sample line 17. A strainer 32 may advantageously be placed in line 17 to remove any solid matter which might otherwise obstruct subsequent equipment. A uniform flow of the desired amount is provided by a flow-regulator, indicated by pressure reducing valve 18 followed by restriction 19. Restriction 19 may conveniently be a foot or two of $\frac{1}{16}''$ I. D. tubing which, with a pressure of approximately 40 p. s. i. g. maintained on the down stream side of valve 18 will produce a flow of about 1 or 2 gallons per minute. For convenient setting of regulator 18, pressure gage 33 may be inserted as shown. From orifice 19 the sample stream passes through heating coil 20 located in a thermostatically controlled bath 34 and thence through line 35 into flash chamber 21. In flash chamber 21 the volatile hydrocarbons flash off from the acid and are vented from the system through line 23. The acid, thus freed of volatile hydrocarbons, accumulates in trap 22 wherein any hydrocarbons separating as a liquid layer from the acid, as indicated at 36, are skimmed off through line 24.

To assist in the separation of gaseous hydrocarbons from the acid, chamber 21 advantageously may contain contact material 37 such as small raschig rings, baffles, or the like, over the surface of which the acid is distributed as it flows downward through chamber 21 into trap 22. From trap 22 the clear acid flows by gravity through cooling coil 25 in which it is brought to the desired temperature for gravity determination in jar 26. For this purpose coil 25 may be immersed in a thermostatically controlled bath 38 the temperature of which may be regulated as shown by thermometer element 39 inserted in jar 26 controlling cold water valve 40.

As stated previously, the gravity of the clear acid in jar 26 may be determined by visual inspection of hydrometer 28 or, by suitable instrumentation, hydrometer 28 may be designed to operate a recorder or a control instrument, the latter regulating the acid strength in the alkylation plant. This is indicated in Figure 2 by hydrometer 28 being fitted with a small armature 41 moving within coil 42 in accordance with the position of hydrometer 28. Variations in the electro-magnetic flux in coil 42 caused by variations in position of armature 41 are translated by instrument 29 into desired control and/or recording signals.

The heat supplied to the sample stream in coil 20 should be such as to maintain a uniform temperature of the acid in trap 22, since the exact temperature of the acid at this point affects the amount of hydrocarbons remaining dissolved in the acid leaving trap 22 and thus, in turn, affects the gravity of the acid as it reaches hydrometer jar 26. Accordingly, the temperature of bath 34 is regulated in accordance with the temperature of the acid in trap 22. This is indicated in Figure 2 by thermometer 43 controlling a mixture of hot and cold water supplied to bath 34. For best all around results line 35, chamber 21 and trap 22 should be encased in suitable heat insulation (not shown). It may also be desirable to insulate bath 34 for still further uniformity.

Obviously, in lieu of bath 34, other suitable means may be used to supply heat to coil 20, such as for example an electrical heating element surrounding coil 20 and thermostatically controlled in accordance with the temperature desired in trap 22. However, a water bath such as shown is advantageous from a fire-hazard standpoint and has proven to be adequately responsive to temperature regulation when an ample flow of water is maintained therethrough. This can be conveniently accomplished by providing a constant flow of hot water thereto and regulating the temperature by mixing therewith a stream of cold water controlled by thermometer 43. Other suitable arrangements will suggest themselves to a skilled engineer.

The exact value selected for the temperature of the acid in trap 22 is unimportant providing the selected temperature is constantly maintained. Though the gravity of the acid as determined at hydrometer 28 is a function of the particular temperature selected for the acid in trap 22, suitable gravity-acid strength tables can be prepared for any selected temperature and instrument 29 can be adjusted accordingly. However, the temperature selected must be high enough to separate substantially all the gaseous hydrocarbons in chamber 21 without troublesome foam, and the temperature anywhere in the system should not be so high that substantial decomposition of dissolved hydrocarbons and/or sulfonated hydrocarbons in the acid is induced. A selected temperature of 105° F. has proven satisfactory at thermometer 43; however, a selected temperature anywhere between 90° F. and 150° F. or even somewhat lower or higher, should be satisfactory in the average installation.

The particular size of the apparatus used may vary considerably, but its size is dependent upon the size of sample stream which may conveniently be withdrawn from line 9. Apparatus size is also dependent upon the permissable time-lag in the apparatus. For example, if a maximum time lag of 15 minutes is to be maintained with a sample stream of 2 gallons per hour, the total volume of the apparatus including strainer 32, trap 22, hydrometer jar 26, coils 20 and 25, the several connecting lines and the hold-up in chamber 21 must be less than one-half gallon. Obviously, the entire apparatus should be constructed of suitable acid-resistant materials.

In Figure 3 is shown a preferred arrangement for flash chamber 21. In Figure 3 chamber 21 and trap 22 are shown surrounded with insulation 44 which extends, along inlet pipe 35, preferably over the entire length of the latter. Within chamber 21 and coaxial therewith is located a cylindrical basket 45 of acid resistant metal, perforated on the sides and bottom and open at the top. Basket 45 is somewhat smaller in diameter than chamber 21, thereby providing annular space 46 between basket 45 and the inside walls of chamber 21. Basket 45 is filled with Raschig rings 37. Inlet pipe 35 extends within chamber 21 and is provided with a header containing orifices adapted to distribute the heated acid over the top of Raschig rings 37. With this form of flash chamber, gas liberated from the heated acid as it trickles down through the Raschig rings leaves the basket through its many perforations and enters annular space 46 and thence, in a free path, to vent 23. Such an arrangement greatly facilitates the separation of the gas over the form of chamber illustrated in Figure 2 where the contact material extends to the walls of chamber 21 making it necessary for some of the evolved gas to make its way upward through the contact material.

The invention has been described above in conjunction with a specific type of alkylation process for which it was particularly designed. However, it is useful in conjunction with other forms of sulfuric acid alkylation process and, also, with other processes wherein strong sulfuric acid is contacted under pressure with normally gaseous hydrocarbons. In such processes it is generally desirable to withdraw a sample of the acid from time to time for control purposes. The invention provides a ready means of obtaining such sample without the customary difficulties arising from the sudden volatilization of the hydrocarbons in the withdrawn sample.

I claim:

1. Apparatus adapted to condition a sample acid stream from an alkylation process and the like, comprising: a flash chamber containing a gas vent near its upper extremity and communicating with an acid-trap near its lower extremity, a sample line entering said flash chamber near its top and below said vent, said sample line being adapted at its other end to receive a sample acid stream from an alkylation process, a flow-regulator in said sample line, a heating coil in said sample line between said flow-controller and said flash chamber, a temperature sensitive element in said trap, means adapted to control heat supplied to said heating coil in accordance with the temperature of said element, an overflow outlet in said trap, a sample accumulating vessel having an overflow, a conduit connecting a lower point of said trap to a lower point of said vessel, and a cooling coil in said conduit adapted to impart a constant temperature to liquid flowing therethrough, said vessel being adapted to be positioned so that liquid in said trap will flow by gravity into and overflow said vessel.

2. Apparatus according to claim 1 in which the flash chamber is heat-insulated.

3. Apparatus according to claim 1 in which the sample accumulating vessel contains a specific gravity sensitive element responsive to the specific gravity of liquid within said vessel.

4. Apparatus according to claim 1 in which the sample accumulating vessel contains a gravity sensitive element connected to and adapted to actuate a remote-control instrument.

5. Apparatus according to claim 1 in which the flash chamber contains contact elements adapted to increase the surface of acid flowing downward through said chamber.

6. Apparatus according to claim 5 in which said contact material is contained within a perforated container supported coaxially with the flash chamber and providing an annular space between the container and the inside walls of the chamber.

7. In combination with an alkylation system including hydrocarbon-sulfuric acid contacting apparatus, an acid-hydrocarbon settling vessel and a recycle acid line adapted to return settled acid to said contacting apparatus, control apparatus comprising: means including an inlet valve for introducing sulfuric acid into said system, means including an outlet valve for withdrawing used acid from said recycle line, a sample withdrawal line communicating with said recycle line and at its other end with a flash chamber, a flow-controller in said sample line, heating means in said sample line between said flow controller and said flash chamber, a gas vent at the top of said flash chamber, an acid trap communicating with the bottom of said flash chamber, an overflow vent from said trap, a sample accumulating vessel having an overflow, a conduit connecting a lower point of said trap to a lower point of said vessel, a cooling coil in said conduit adapted to impart a constant temperature to liquid flowing therethrough, means connected to said sample vessel adapted to actuate said outlet valve in accordance with the gravity of acid in said sample vessel, and a level control connected to said settling vessel adapted to control said inlet valve in accordance with the hydrocarbon-sulfuric acid interface level in said settling vessel.

8. In combination with an alkylation system including hydrocarbon-sulfuric acid contacting apparatus, an acid-hydrocarbon settling vessel and a recycle acid line adapted to return settled acid to said contacting apparatus, control apparatus comprising: means including an inlet valve for introducing sulfuric acid into said system, means including an outlet valve for withdrawing used acid from said recycle line, a sample withdrawal line communicating with said recycle line and at its other end with a flash chamber, a flow-controller in said sample line, heating means in said sample line between said flow controller and said flash chamber, a gas vent at the top of said flash chamber, an acid trap communicating with the bottom of said flash chamber, an overflow vent from said trap, a sample accumulating vessel having an overflow, a conduit connecting a lower point of said trap to a lower point of said sample vessel, a cooling coil in said conduit adapted to impart a constant temperature to liquid flowing therethrough, means connected to said sample vessel adapted to actuate said inlet valve in accordance with the gravity of acid in said sample vessel, and a level control connected to said settling vessel adapted to control said outlet valve in accordance with the hydrocarbon-sulfuric acid interface level in said settling vessel.

CHARLES L. PERSYN, Jr.

REFERENCES CITED

The following references are of record in the file of this patent:

UNITED STATES PATENTS

| Number | Name | Date |
|---|---|---|
| 1,141,266 | Raschig | June 1, 1915 |
| 1,328,942 | Carter | Apr. 17, 1920 |
| 1,420,209 | Paulus | June 20, 1922 |
| 1,452,206 | Mann | Apr. 17, 1923 |
| 2,047,611 | Baxter | July 14, 1936 |
| 2,437,290 | Bottenberg | Mar. 9, 1948 |
| 2,480,240 | Harper | Apr. 30, 1949 |
| 2,488,943 | Shearer | Nov. 22, 1949 |
| 2,545,314 | Seebold | Mar. 13, 1951 |